United States Patent
Lesko et al.

(10) Patent No.: US 10,359,225 B2
(45) Date of Patent: Jul. 23, 2019

(54) REFRIGERATOR VIBRATION ISOLATING COMPRESSOR MOUNT

(71) Applicant: Whirlpool Patents Company, Benton Harbor, MI (US)

(72) Inventors: Daniel J. Lesko, Kalamazoo, MI (US); Kaveh Esmael, Ann Arbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 477 days.

(21) Appl. No.: 15/063,094

(22) Filed: Mar. 7, 2016

(65) Prior Publication Data

US 2017/0254582 A1 Sep. 7, 2017

(51) Int. Cl.
| | |
|---|---|
| *F25D 19/00* | (2006.01) |
| *F25D 23/00* | (2006.01) |
| *F16F 1/373* | (2006.01) |
| *F16F 15/08* | (2006.01) |
| *F25B 13/00* | (2006.01) |
| *F25B 31/00* | (2006.01) |

(Continued)

(52) U.S. Cl.
CPC ........ *F25D 23/006* (2013.01); *F04B 39/0044* (2013.01); *F04B 39/121* (2013.01); *F16F 1/3732* (2013.01); *F16F 15/08* (2013.01); *F25B 13/00* (2013.01); *F25B 31/00* (2013.01); *F25B 2500/12* (2013.01); *F25B 2500/13* (2013.01)

(58) Field of Classification Search
CPC .. F25B 2500/12; F25B 2500/13; F25B 31/00; F25B 13/00; F25D 23/006; F04B 39/0044; F04B 39/121; F16F 1/376; F16F 1/3732; F16F 15/08
See application file for complete search history.

(56) References Cited

U.S. PATENT DOCUMENTS

| | | | | |
|---|---|---|---|---|
| 3,785,167 A | * | 1/1974 | Sahs | F25D 23/006 417/312 |
| 4,490,992 A | * | 1/1985 | Chastine | F25D 23/006 248/606 |

(Continued)

FOREIGN PATENT DOCUMENTS

| | | |
|---|---|---|
| CN | 105041611 | 11/2015 |
| EP | 1043554 | 10/2000 |

(Continued)

*Primary Examiner* — Keith M Raymond
*Assistant Examiner* — Kamran Tavakoldavani
(74) *Attorney, Agent, or Firm* — Diederiks & Whitelaw, PLC.

(57) ABSTRACT

A mounting arrangement secures a refrigerator compressor to a support base member through a plurality of elastomeric mounts secured on pin elements with retainers. The mounts include head portions which extend through openings provided in an elongated plate fixed to the compressor. The mounts are specifically formed with a rounded bottom to pre-load the mounting arrangement and prevent vibration transmission through cores of the mounts. In addition, each mount includes a plurality of vertically spaced rings which provide shock protection against a large impact force by deflecting and potentially contacting each other, while normal vertical isolation occurs by deflection of an uppermost one of the rings. The mounts are formed with various undercuts which allow the mounts to be optimized for the mass and operational frequency of the compressor.

20 Claims, 6 Drawing Sheets

(51) Int. Cl.
*F04B 39/00* (2006.01)
*F04B 39/12* (2006.01)

(56) References Cited

U.S. PATENT DOCUMENTS

| | | | |
|---|---|---|---|
| 4,920,696 A | 5/1990 | Mawby et al. | |
| 5,040,953 A | 8/1991 | Tinsler | |
| 5,306,121 A * | 4/1994 | Heflin | F04B 39/0044 248/638 |
| 5,313,806 A | 5/1994 | Feng | |
| 5,871,199 A | 2/1999 | Koike et al. | |
| 5,913,892 A * | 6/1999 | Kwon | F16F 15/046 248/624 |
| 5,964,579 A | 10/1999 | Tang et al. | |
| 6,336,794 B1 | 1/2002 | Kim | |
| 6,357,717 B1 | 3/2002 | Kennard, IV | |
| 6,786,298 B1 | 9/2004 | Chang et al. | |
| 6,912,865 B2 | 7/2005 | Seo et al. | |
| 6,912,866 B2 | 7/2005 | Seo et al. | |
| 7,278,834 B2 | 10/2007 | Herrick et al. | |
| 7,465,156 B2 | 12/2008 | Lee | |
| 7,735,812 B2 * | 6/2010 | Fitzgerald | F16F 15/08 267/141 |
| 2004/0096341 A1 | 5/2004 | Hung | |
| 2004/0173426 A1 * | 9/2004 | Athanasiou | F16F 3/04 188/378 |
| 2005/0106042 A1 | 5/2005 | Lee et al. | |
| 2011/0154676 A1 | 6/2011 | Castiglione et al. | |

FOREIGN PATENT DOCUMENTS

| | | |
|---|---|---|
| JP | 2002115744 | 4/2002 |
| JP | 2014055633 | 3/2014 |
| WO | 2007/122235 | 11/2007 |
| WO | 2013/111356 | 8/2013 |
| WO | 2015/068754 | 5/2015 |

* cited by examiner

US 10,359,225 B2

REFRIGERATOR VIBRATION ISOLATING COMPRESSOR MOUNT

BACKGROUND OF THE INVENTION

The present invention pertains to the art of refrigerators and, more particularly, to an arrangement for mounting a compressor in a refrigerator.

Most refrigerators, particularly those sold for common household use, include a mechanical compartment or chamber for mounting various refrigeration components, such as a compressor, a condenser and/or an evaporator. Depending on the particular model type, the mechanical compartment can be in a lower or upper region of the refrigerator. In either case, the mechanical compartment includes a support base onto which the refrigeration component(s) is mounted. When activated, many of the refrigeration components, including fans associated with the compressor and evaporator, vibrate. Unless properly attenuated, the vibration will be amplified by the refrigerator and result in noise at potentially unacceptable levels. Given that consumers demand quiet appliances, any noise generated must be reduced to absolute minimum levels. To alleviate this problem, the refrigeration components are typically mounted to the support base through a vibration isolation element or damper. For instance, it is known to use an elastomeric grommet or other resilient material as both a damper and a support for the refrigeration component.

The use of a vibration isolating arrangement is particularly important in connection with the mounting of the refrigerator compressor. With this in mind, manufacturers have been known to employ a wide array of mounting arrangements to secure a compressor in a refrigerator. Typically, a stud or other fastener receiving element is secured to the support base. In arrangements that make use of a stud, a grommet or other dampening device is positioned about the stud, and the compressor is secured to a plate through the stud, while being supported on the grommet. At this point, a nut or other threaded fastener is secured to the stud to hold the compressor in place. In other arrangements, a bolt is passed through the grommet and fastened to a threaded opening provided in the support base.

Despite the various mounting arrangements described in the prior art, there still exists a need for an enhanced mounting arrangement for refrigeration components. More specifically, there exists a need for a mounting arrangement that can secure a compressor in a refrigerator which can more effectively attenuate any vibrations developed during operation. In particular, there is a need for a refrigerator compressor mounting arrangement which is designed to, among other things, have a tuned mechanical stiffness and provide enhanced mechanical shock protection, preferably while permitting both lateral and fore-to-aft shifting of the compressor.

SUMMARY OF THE INVENTION

The present invention is directed to an arrangement for mounting a compressor in a mechanical chamber provided in a cabinet of a refrigerator. The mounting arrangement employs elastomeric mounts, each of which includes a rounded bottom to pre-load the mounting arrangement and prevent vibration transmission through a core of the mount. In addition, each mount includes a plurality of vertically spaced rings which provide shock protection against any large impact force by deflecting and potentially contacting each other. Normal vertical isolation occurs by deflection of an upper one of the rings. The mounts are formed with various undercuts which allow the mounts to be optimally tuned for the mass and operational frequency of the compressor.

In accordance with one embodiment of the invention, the overall mounting arrangement includes a plurality of pin elements extending from a support base member, while the compressor is fixed to an elongated plate having upper and lower surfaces and a plurality of spaced openings. Each of the plurality of elastomeric mounts includes an upper head, which is spaced from an adjacent one of the vertically spaced rings by a mounting gap, extending through a respective one of the plurality of openings such that the elongated plate is positioned within the mounting gaps of the various mounts. The mounts are positioned about the plurality of pin elements. Each upper head includes an upper surface from which project a plurality of spaced raised retention members that are engaged by a respective retainer, preferably in the form of a clip, in a manner which assures that the compressor is not constrained for movement in both lateral and fore-to-aft directions.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE INVENTION

Figure 1:
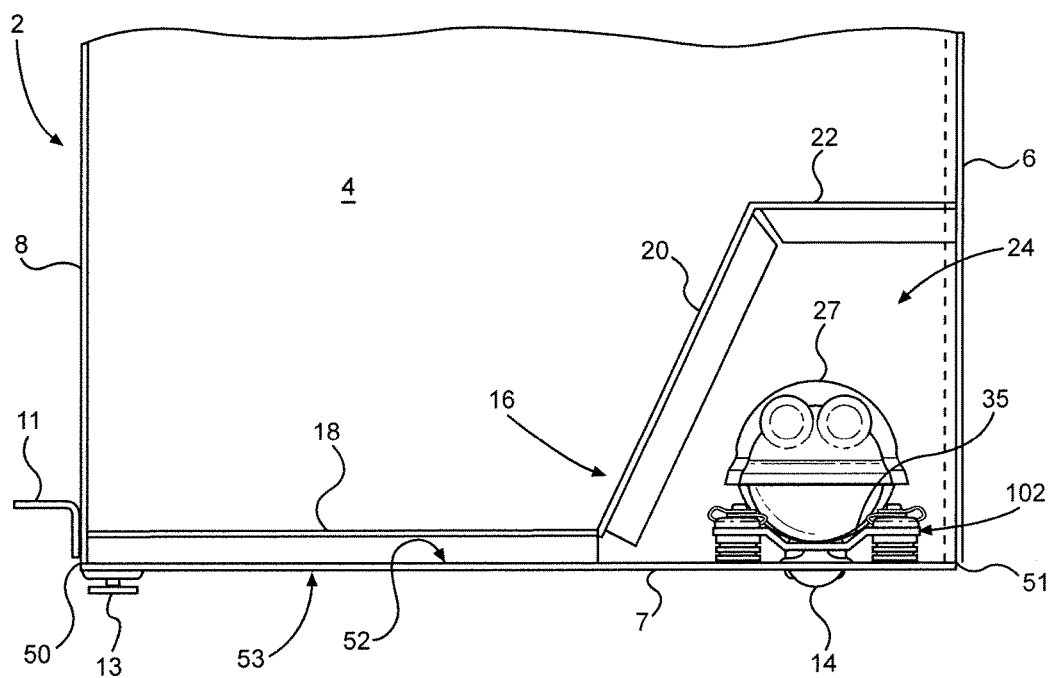
FIG. 1 is a partial, cross-sectional view of a refrigerator illustrating a compressor mounted in a mechanical chamber of the refrigerator using a compressor mounting arrangement constructed in accordance with the present invention.

With initial reference to FIG. 1, a refrigerator is generally indicated at 2 and includes a cabinet defined, in part, by a side panel 4 and a top panel (not shown) which are generally formed from bending a single sheet of metal to which a rear panel 6 and a bottom panel or support base member 7 are attached. Side panel 4 terminates at a forward end in a front in-turned flange 8, which is shown to have mounted thereto a mounting bracket 11 for pivotally supporting a refrigerator door (not shown). As shown, refrigerator 2 includes a pair of spaced front leg members, one of which is indicated at 13, arranged at laterally spaced front portions (not separately labeled) of the cabinet. In addition, refrigerator 2 includes laterally spaced rear wheels, one of which is indicated at 14. Leg members 13 are preferably vertically adjustable to also act as levelers for cabinet 2, while wheels 14 enhance the maneuverability of refrigerator 2. Such type of leg leveler and wheel support arrangements are widely known in the art of appliances, do not form part of the present invention and therefore will not be discussed further herein.

Refrigerator 2 can take various forms, including top mount, bottom mount, side-by-side and French-style refrigerators. By way of example, as shown in these drawings, the cabinet of refrigerator 2 has mounted therein a bottom panel unit 16 that includes a first horizontal portion 18, an upwardly and fore-to-aft sloping portion 20, and a second horizontal portion 22. Bottom panel unit 16, support base member 7 and rear panel 6 combine to define a mechanical compartment or chamber 24 which, in the embodiment shown, is arranged at a lower, rear portion of refrigerator 2. Mounted within mechanical chamber 24 is a refrigeration system including a compressor 27 that is attached to an elongated plate 35.

In the embodiment shown, support base member 7 includes first and second longitudinally spaced end portions 50 and 51 and upper and lower surfaces 52 and 53. Although support base member 7 is positioned at a bottom portion of refrigerator 2, it should be understood that, depending on the particular model or refrigerator type, support base member 7 could be re-positioned, even at an upper portion of the cabinet. In any event, the invention is concerned with mounting of compressor 27 to support base member 7 through the use of multiple vibration isolating mounts, one of which is generally indicated at 102 as described in detail below.

Figure 2:
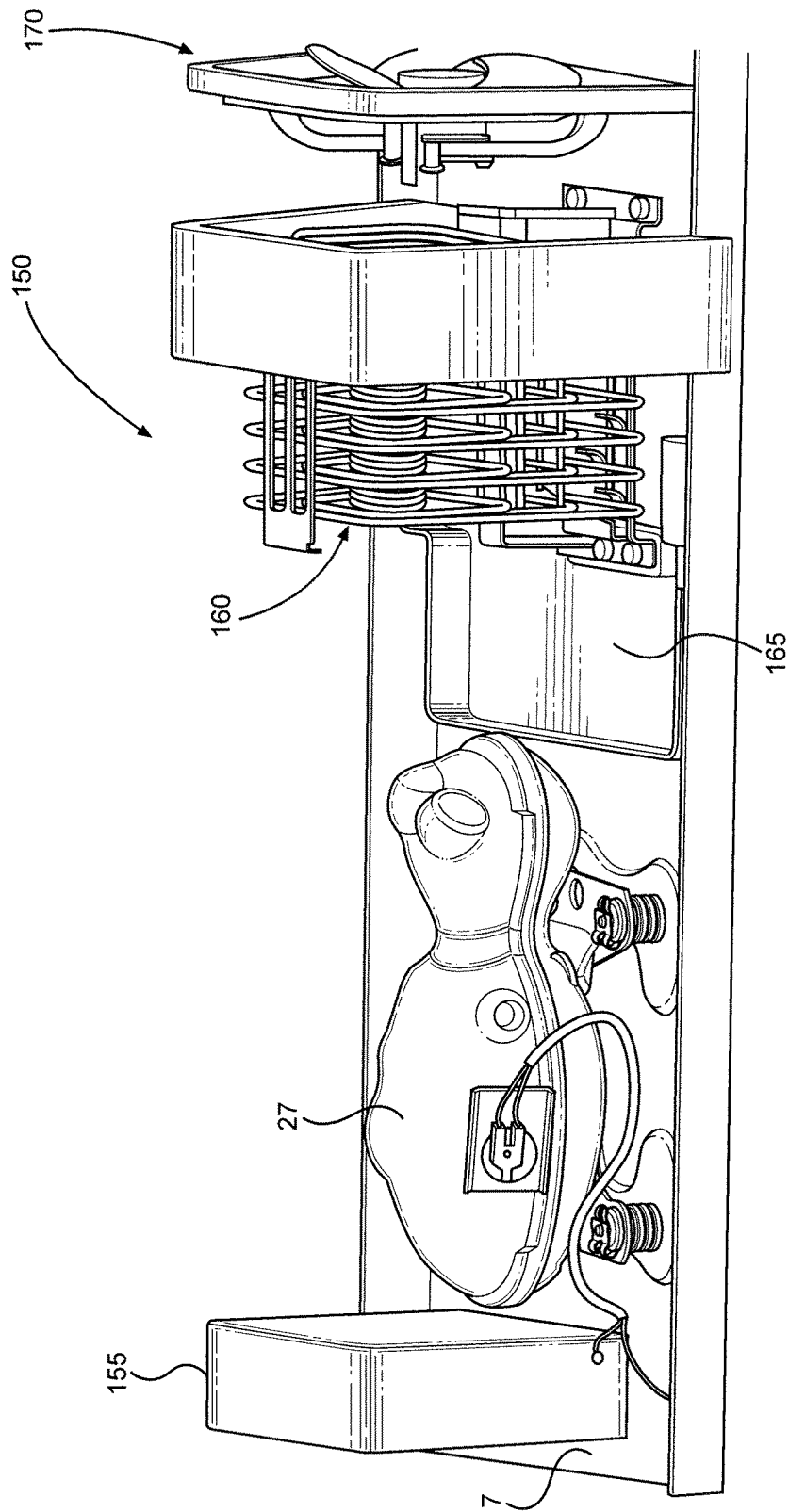
FIG. 2 is perspective view of a refrigeration system with the compressor mounted to a support base member using the mounting arrangement of the present invention.
Figure 3:
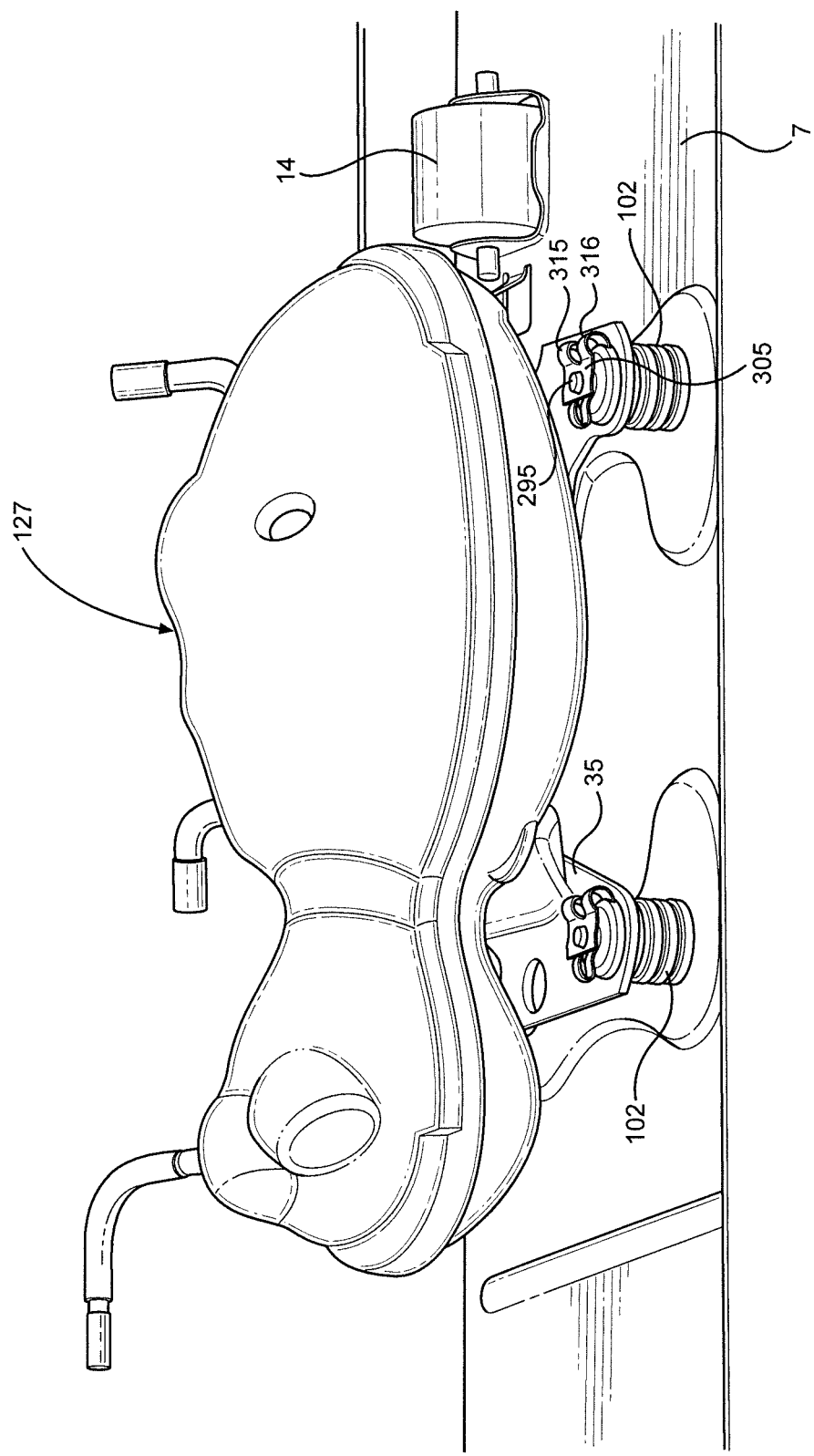
FIG. 3 is an enlarged perspective view of the mounted compressor of FIG. 2.

Prior to detailing the preferred construction of each vibration isolating mount 102, reference is made to FIGS. 2 and 3 in providing additional overall refrigeration system details. As best shown in FIG. 2, the refrigeration system is generally indicated at 150 and includes a controller 155, compressor 27, a condenser 160 mounted in a pan 165 arranged upon base member 7 and a fan 170. For purposes of simplicity of the drawings, the electrical wiring and fluid tubing associated with refrigeration system 150 has been removed, although some wiring is shown in FIG. 2 and some tubing in FIG. 3, though not labeled.

Figure 4:
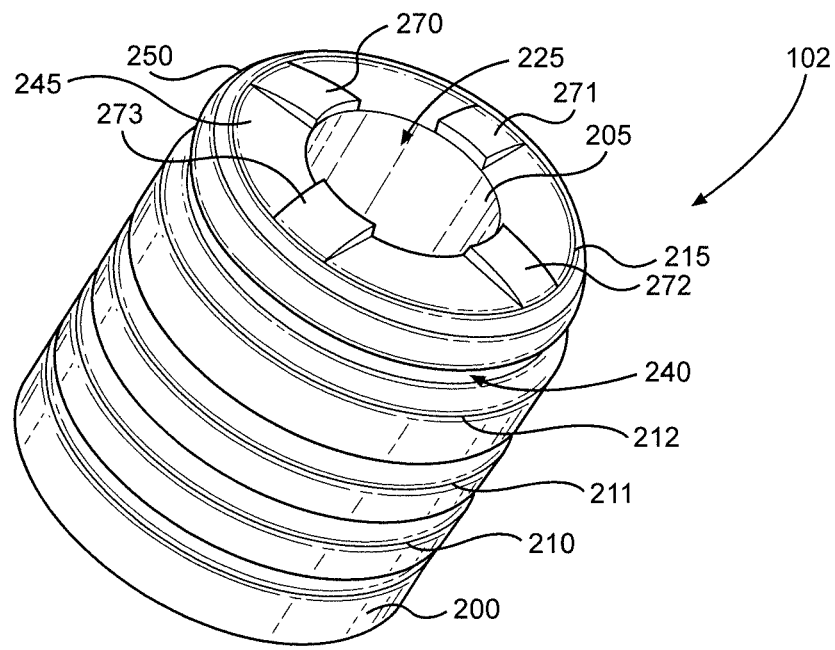
FIG. 4 is an upper perspective view of a vibration isolating mount employed in the mounting arrangement of the invention.
Figure 5:
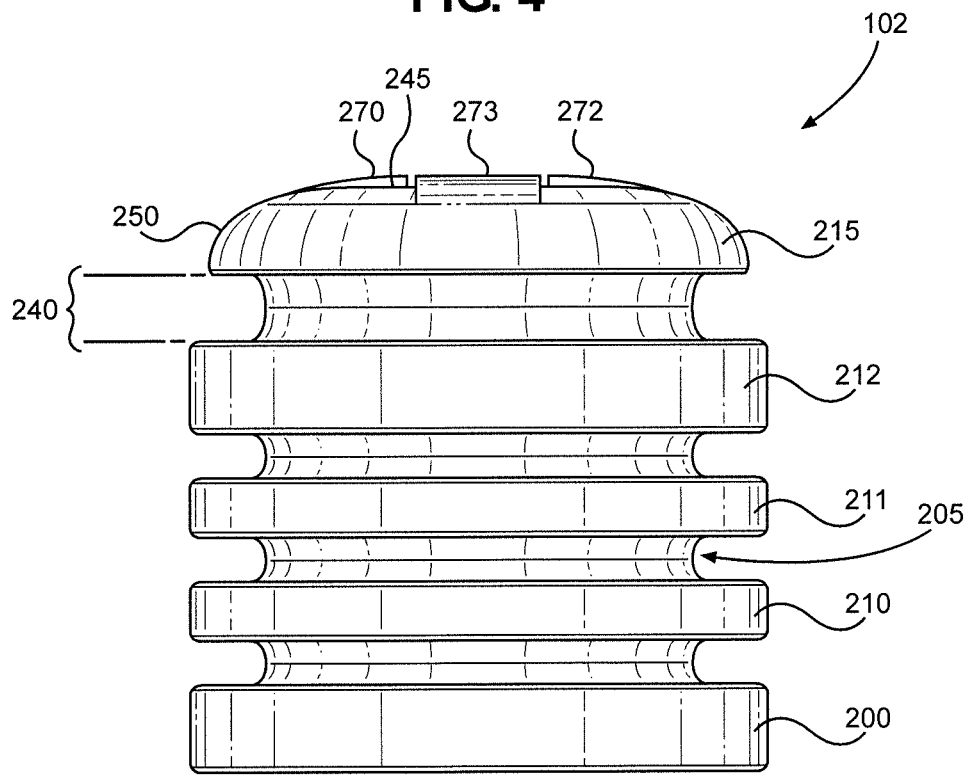
FIG. 5 is an elevational view of the vibration isolating mount of FIG. 4.
Figure 6:
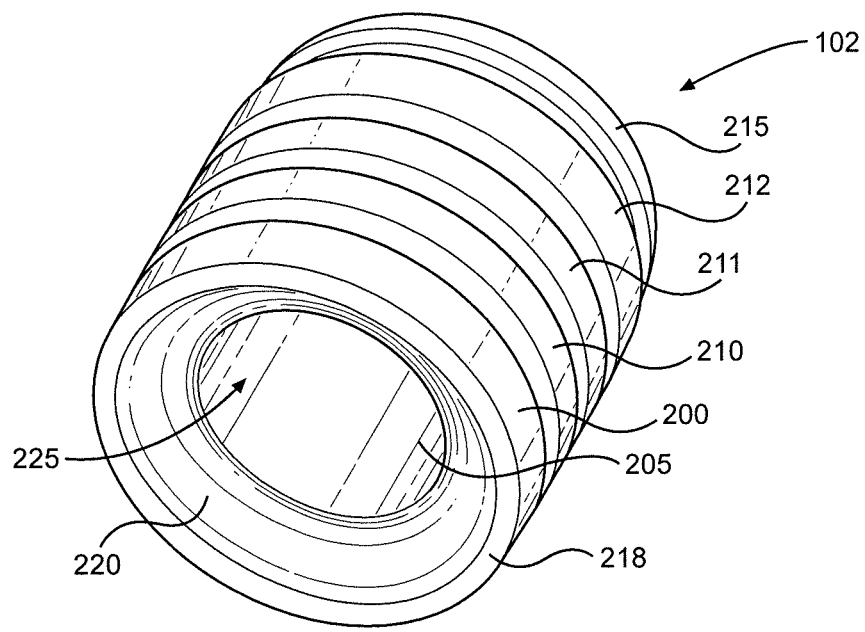
FIG. 6 is a lower perspective view of the vibration isolating mount of FIGS. 4 and 5.

Reference will now be made to FIGS. 4-6 in detailing the structure of vibration isolating mount 102, which is employed to secure compressor 27 to support base member 7 in order to absorb vibrations produced during operation of compressor 27, in accordance with one preferred embodiment of the invention. In general, vibration isolating mount 102 is made of an elastomeric material so as to be deformable for shock absorbing purposes, yet resilient so as to readily rebound to its original configuration after deformation. The preferred material employed is EPDM. As depicted, each mount 102 includes a base 200, a central body or core 205, a plurality of vertically spaced, circumferential rings 210-212 projecting radially outward from central body 205, and an upper head 215. For reasons detailed more fully below, base 200 and ring 212 have a greater thickness or vertical dimension than either of rings 210 and 211. Between base 200 and ring 210, as well as between ring 211 and 212, central body 205 are concave in shape, with these portions of mount 102 establishing undercuts. As best shown in FIG. 6, base 200 includes an annular flat portion 218 extending radially outwardly of a tapering and rounded bottom portion 220 leading to central body 205. This figure, as well as FIG. 4, clearly illustrates that central body 205 is provided with a through hole 225. Mount 102 is also formed with a mounting gap 240 between upper head 215 and ring 212. In addition, upper head 215 has an upper surface 245 formed with an annular, arcuate peripheral edge portion 250 and from which project a plurality of spaced raised retention members 270-273 which taper from through hole 225 to peripheral edge portion 250.

Figure 7:
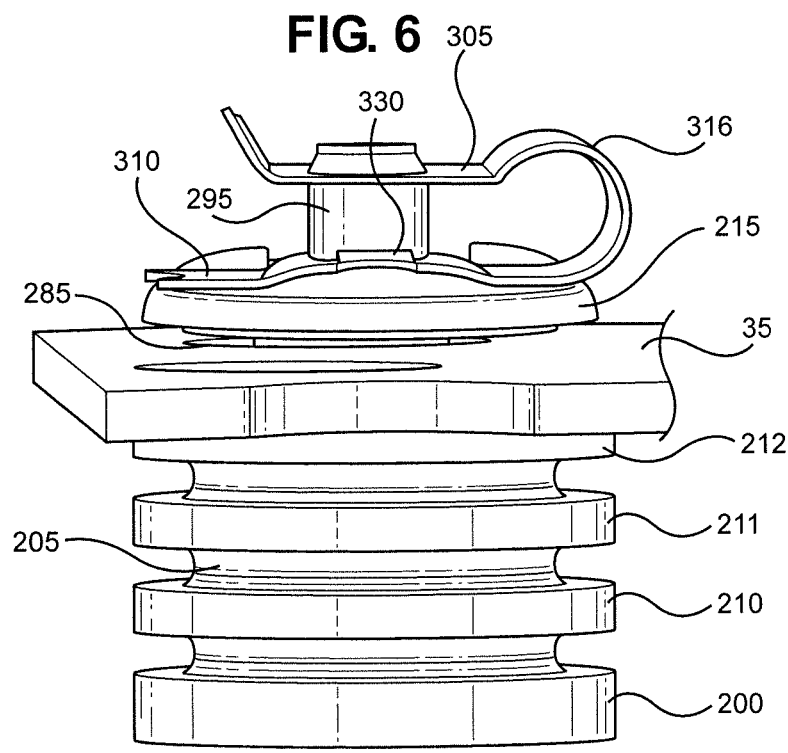
FIG. 7 is an enlarged view of one mount from FIG. 3.
Figure 8:
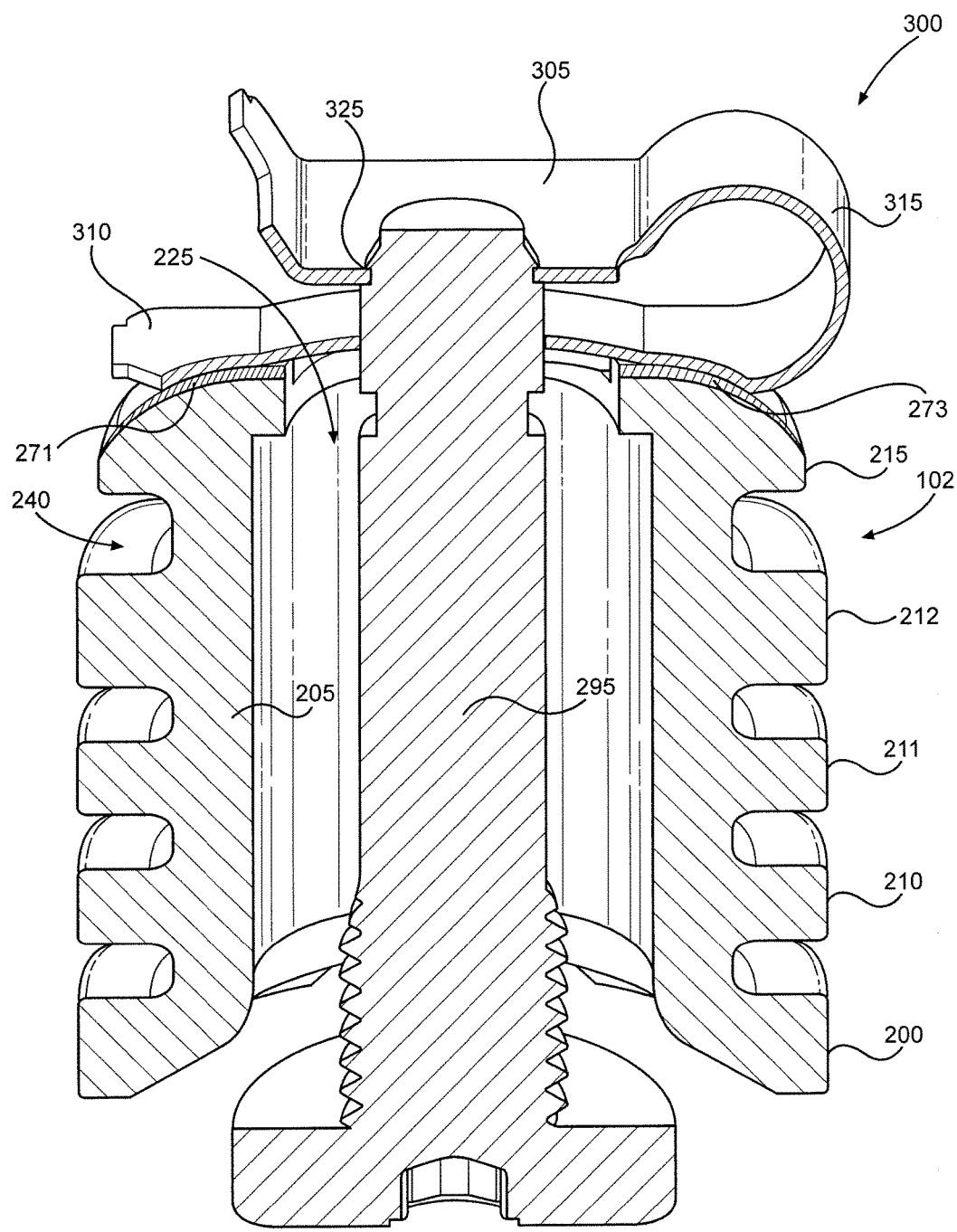
FIG. 8 is a representative cross-sectional view of the mount of FIG. 7.

Although the particular order of mounting steps can be altered, the mounting of compressor 27 in mechanical chamber 24 will now be detailed with main reference to FIGS. 3, 7 and 8. As shown, each elastomeric mount 102 is received in a respective opening, such as indicated at 285 FIG. 7, in the elongated plate 35 such that plate 35 becomes positioned within mounting gap 240 (note plate 35 is missing from FIG. 8 for clarity purposes). The flexibility and tapered construction of upper head 215 enhances this assembly procedure. The elongated plate 35 is positioned above the support base member 7 and over a plurality of pin elements 295 which extend through and are fixed to support base member 7, such as through a friction fit, threaded connection, welding or the like. Upon aligning pin elements 295 with through holes 225, pin elements 295 are caused to project through central body 205 as compressor 27 is lowered until compressor 27 is supported by support base member 7 through the elastomeric mounts 102. Thereafter, a plurality of retainers 300 are used to complete the mounting of compressor 27.

As perhaps best shown in FIGS. 3 and 8, each retainer 300 is constituted by a clip, including an upper leg 305, a lower leg 310 and flexible connecting arms 315 and 316. Each lower leg 310 includes an opening 325 receiving a respective one of the plurality of pin elements 295, with each of the pin elements 295 being compressed onto a respective elastomeric mount 102 and against a respective set of retention members 270-273, e.g., retention members 271 and 273 as shown in FIG. 8. Each lower leg 310 is also provided with opposing barbs (one of which is indicated at 330 in FIG. 7) and extends into opening 315, while engaging the respective pin element 295. Thereafter, each upper leg 305 is snap-connected into an upper groove 325 of a respective pin element 295.

Based on this overall mounting arrangement, various advantageous vibration control features are established. In particular, the rounded bottom functions to pre-load the mounting arrangement and prevent vibration transmission through the cores of the mounts. In addition, the plurality of vertically spaced rings of each mount provide shock protection against a large impact force by deflecting and potentially contacting each other, while normal vertical isolation occurs by deflection of an uppermost ring. Furthermore, providing the various undercuts of the mounts allow the mounts to be optimized for the mass and operational frequency of the compressor. Finally, the inclusion of the retention members isolates clip retention and prevents the compressor from being constrained in the lateral and fore-to-aft directions. Overall, the mounting arrangement of the present invention provides an easy, cost-effective method of securing a compressor in a refrigerator while ensuring appropriate vibration isolation characteristics and mounting integrity.

Although described with reference to preferred embodiments, it should be readily apparent to one of ordinary skill in the art that various changes and/or modifications can be made to the invention without departing from the spirit thereof. In addition, directional related terms, such as upper, lower, lateral, fore-to-aft and the like, as used in the written description are only intended to describe the invention with reference to the drawings such that these terms should not be limiting to the overall mounting arrangement. Finally, it should be realized that the invention is applicable to a wide range of cabinets employing refrigeration components, including dedicated freezer units and refrigerated vending machines. In general, the invention is only intended to be limited to the scope of the following claims.

The invention claimed is:

1. A refrigerator comprising:
a cabinet;
at least one refrigeration compartment within the cabinet;
a mechanical chamber within the cabinet; and
a refrigeration system including a compressor mounted within the mechanical chamber through a mounting arrangement including:
a support base member;
a plurality of pin elements extending from the support base member;
an elongated plate having a plurality of spaced openings, each of said plurality of openings being aligned with a respective one of the plurality of pin elements, said compressor being attached to the elongated plate;
a plurality of elastomeric mounts each including a central body established by a hollow core, a base including a rounded bottom portion leading to the central body, a plurality of vertically spaced rings extending about the central body and spaced by undercut portions, and an upper head spaced from an adjacent one of the vertically spaced rings by a mounting gap;
a plurality of retainers, wherein each of the plurality of elastomeric mounts is: a) attached to the elongated plate with the upper head extending through a respective one of the plurality of openings such that the elongated plate is positioned within the mounting gap; b) positioned about a respective one of the plurality of pin elements with the respective pin element extending through the hollow core; c) and secured upon the support base member by a respective one of the plurality of retainers with the rounded bottom portion of the base being deformed to pre-load the mount.

2. The refrigerator according to claim 1, wherein the base is configured to minimize vibration transmission through the central body.

3. The refrigerator according to claim 1, wherein an uppermost one of the plurality of rings is configured to deflect and provide vertical isolation in response to vibrations developed during operation of the compressor.

4. The refrigerator according to claim 1, wherein the plurality of rings are configured to deflect and contact each other upon a large impact.

5. The refrigerator according to claim 1, wherein the plurality of elastomeric mounts are tuned through the undercut portions based on at least one of a mass and an operational frequency of the compressor.

6. The refrigerator according to claim 1, wherein mounting of the compressor through the plurality of retainers prevents the compressor from becoming constrained in both lateral and fore-to-aft directions.

7. The refrigerator according to claim 6, wherein each said upper head includes an upper surface from which project a plurality of spaced raised retention members for engaging a respective one of the plurality of retainers.

8. The refrigerator according to claim 1, wherein the plurality of retainers are constituted by clips, with each of the clips including an upper leg, a lower leg and at least one connecting arm, with the lower leg including an opening receiving a respective one of the plurality of pin elements.

9. The refrigerator according to claim 8, wherein the upper leg of each of the clips also includes an opening receiving the respective one of the plurality of pin elements.

10. The refrigerator according to claim 8, wherein each said upper head includes an upper surface from which project a plurality of spaced raised retention members and wherein the lower leg of each of the clips engages a respective set of said plurality of raised retention members.

11. The refrigerator according to claim 10, wherein each of said plurality of retainers comprising at least one barb extending from the lower leg into the opening in the lower leg and engaging the respective one of the plurality of pin elements to secure the retainer on the respective one of the plurality of pin elements.

12. A method of mounting a refrigeration compressor in a refrigerator including a cabinet, at least one refrigeration compartment within the cabinet, a mechanical chamber within the cabinet and a refrigeration system including the compressor mounted within the mechanical chamber through a mounting arrangement including a support base member, a plurality of pin elements extending from the support base member, an elongate plate, a plurality of elastomeric mounts and a plurality of retainers with the compressor fixedly mounted to the elongated plate having a plurality of spaced openings aligned with a respective one of the plurality of pin elements, the method comprising:
inserting a respective one of the plurality of elastomeric mounts, each including a central body established by a hollow core, a base including a rounded bottom portion leading to the central body, a plurality of vertically spaced rings extending about the central body and spaced by undercut portions, and an upper head spaced from an adjacent one of the vertically spaced rings by a mounting gap, in each of the plurality of openings in the elongated plate such that the upper head extends through a respective one of the plurality of openings and the elongated plate is positioned within the mounting gap;
positioning the elongated plate onto the support base member with each of the plurality of pin elements being aligned with and extending through the hollow core of a respective said elastomeric mount such that the elastomeric mounts support the compressor upon the support base member; and
mounting a respective one of the plurality of retainers onto each of the plurality of pin elements to secure the elongated plate and elastomeric mounts to the support base member, wherein each of the plurality of elastomeric mounts is: a) attached to the elongated plate with the upper head extending through a respective one of the plurality of openings such that the elongated plate is positioned within the mounting gap; b) positioned about a respective one of the plurality of pin elements with the respective pin element extending through the hollow core; c) and secured upon the support base member by a respective one of the plurality of retainers with the rounded bottom portion of the base being deformed to pre-load the mount.

13. The method of claim 12, further comprising: minimizing vibration transmission from the base through the central body.

14. The method of claim 12, further comprising: deflecting an uppermost one of the plurality of rings to provide vertical isolation in response to vibrations developed during operation of the compressor.

15. The method of claim 12, further comprising: deflecting the plurality of rings and causing at least some of the plurality of rings to contact each other upon a large impact during operation of the compressor.

16. The method of claim 12, further comprising: tuning the plurality of elastomeric mounts through the undercut portions based on at least one of a mass and an operational frequency of the compressor.

17. The method of claim 12, further comprising: preventing the compressor from becoming constrained in both lateral and fore-to-aft directions through the mounting of the compressor through the retainers.

18. The method of claim 17, further comprising: engaging a respective one of the retainers with raised retention members projecting from each said upper head.

19. The method of claim 12, further comprising: clipping each of the plurality of retainers upon a respective one of the plurality of pin elements.

20. The method of claim 19, further comprising: engaging a plurality of raised retention members projecting from the upper head with the retainer.

* * * * *